US006668074B1

(12) United States Patent
Wilson

(10) Patent No.: US 6,668,074 B1
(45) Date of Patent: Dec. 23, 2003

(54) APPARATUS AND METHOD FOR UTILIZING MULTIPLE DIGITAL IMAGE REPRESENTATIONS OF A DOCUMENT

(75) Inventor: Allen J. Wilson, Novi, MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/533,847

(22) Filed: Mar. 23, 2000

(51) Int. Cl.[7] .................................................. G06K 9/00
(52) U.S. Cl. ........................ 382/138; 382/218; 382/228
(58) Field of Search .................................. 382/135, 137, 382/138, 139, 140, 159, 217, 218, 224, 225, 228, 229

(56) References Cited

U.S. PATENT DOCUMENTS

| 5,937,084 A | * | 8/1999 | Crabtree et al. ............ 382/137 |
| 6,122,399 A | * | 9/2000 | Moed ......................... 382/159 |
| 2002/0067846 A1 | * | 6/2002 | Foley ......................... 382/139 |

* cited by examiner

*Primary Examiner*—Mehrdad Dastouri
(74) *Attorney, Agent, or Firm*—Lise A. Rode; Mark T. Starr; Harness, Dickey & Pierce P.L.C.

(57) ABSTRACT

A document processing system includes an image capture system, a multiple engine recognition system, and an application system. The image capture system generates a first electronic image of a first region of a document, where the first electronic image has a first image format. The image capture system also generates a second electronic image of a second region of a document, where the second electronic image has a second image format. The multiple recognition system transmits the first electronic image to a first recognition engine and a second recognition engine. The multiple engine recognition system also transmits the second electronic image to the second recognition engine. The first recognition engine generates a first recognition result, and the second recognition engine generates a second recognition result. The recognition system further combines the first recognition result and the second recognition result into a final recognition result. The application system transmits the first electronic image and the second electronic image from the image capture system to the recognition system and retrieves the final recognition result from the recognition system. Utilizing multiple recognition engines and multiple image formats allows greater customization of the final recognition result, and therefore improves recognition rates.

18 Claims, 15 Drawing Sheets

60

\Unicar\CarParam\Catalog.txt
\Unicar\CarParam\CarDP500\CGK\Appconf.ini
\Unicar\CarParam\CarDP500\CGK\...
\Unicar\CarParam\CarDP500\Mitek\Parameter.ini
\Unicar\CarParam\CarDP500\Mitek\DocType1_CCITT.frm
\Unicar\CarParam\CarDP500\Mitek\DocType1_JPEG.frm
\Unicar\CarParam\CarDP500\Mitek\DocType2_CCITT.frm
\Unicar\CarParam\CarDP500\Mitek\DocType2_JPEG.frm
\Unicar\CarParam\CarDP500\Mitek\Unisys.ini
\Unicar\CarParam\CarDP500\Mitek\Image.ini
\Unicar\CarParam\CarDP500\Mitek\DocType1_CCITT.tif
\Unicar\CarParam\CarDP500\Mitek\DocType1_JPEG.tif
\Unicar\CarParam\CarDP500\Mitek\DocType2_CCITT.tif
\Unicar\CarParam\CarDP500\Mitek\DocType2_JPEG.tif
\Unicar\CarParam\CarSourceNDP\CGK\Appconf.ini
\Unicar\CarParam\CarSourceNDP\CGK\...
\Unicar\CarParam\CarSourceNDP\Mitek\Parameter.ini
\Unicar\CarParam\CarSourceNDP\Mitek\DocType1_CCITT.frm
\Unicar\CarParam\CarSourceNDP\Mitek\DocType1_JPEG.frm
\Unicar\CarParam\CarSourceNDP\Mitek\DocType2_CCITT.frm
\Unicar\CarParam\CarSourceNDP\Mitek\DocType2_JPEG.frm

Figure 14

APPARATUS AND METHOD FOR UTILIZING MULTIPLE DIGITAL IMAGE REPRESENTATIONS OF A DOCUMENT

FIELD OF THE INVENTION

The invention generally relates to courtesy amount recognition of financial documents. More specifically, the invention concerns a recognition system utilizing multiple images and recognition engines.

BACKGROUND ART

Banks, credit unions and other financial institutions regularly process checks, deposit slips, remittance stubs and other types of documents in order to execute financial transactions efficiently. Automated document processing systems have therefore become quite prevalent in the industry. It is common for these document processing systems to generate electronic images of the documents being processed so that computerized user applications can make use of the information contained on the documents. In order for these user applications to make the most use of electronic images, some form of character recognition must typically be performed on the images.

A common example of the above need for character recognition can be found with the standard negotiable check. For example, it is highly desirable to be able to determine the courtesy amount numerically written on the check via computer. This capability would allow an institution to compare a remitted check with a known account balance in an extremely efficient manner. Numerous approaches have been made at courtesy amount recognition (CAR) using various types of images such as JPEG, JPEG Snippets, and CCITT images, and are well known in the art. More complicated recognition engines have even made considerable headway in legal amount recognition (LAR) in conjunction with CAR to further improve recognition rates.

It is important to note that generally, there are not well defined standards for all of the worlds financial documents. For example, the amount fields themselves have multiple formats, e.g. different leading monetary symbols such as $, *, or no symbol at all. In addition to the absence of standards, some documents have multiple amounts printed on them. Many business checks have preprinted notations on them with amount field-like information in the notations, and deposit tickets will typically have more than one amount field. In general, recognition engines perform two fundamental steps in the recognition process. They must search the image to find the appropriate amount field, then once it is found they perform the recognition on the field. When a recognition engine indicates it cannot read the image, it frequently is the case that it could not find the field. Due to the absence of standards, typical recognition engines also need to be informed of image location information to assist the recognition process. This location information is typically obtained during the image capture process, and is frequently referred to as the document type.

While the above advancements have been made in CAR, recognition rates have failed to improve beyond certain thresholds. For example, it is highly desirable to maximize read rates and minimize misread rates. The read rate is the number of successfully read items, whereas the misread rate is the number of read items with misreads or substitutions in the string. Thus, the read rate is based on the total number of items on a document, and the misread rate is a percentage based on the total number of read items. For example, in the case of one hundred checks, it is typical that a total of one hundred recognition requests will be made to identify the courtesy amounts. If eighty-five of the read results returned indicate a successful read, then the read rate equals 85%. Similarly, if of the eighty-five, two are misread, then the misread rate will equal 2 divided by 85, or 2.35 percent. Misreads occur when a character is substituted with the incorrect character, dropped, or added to the actual information on the document. Under conventional CAR approaches, industry read rates have leveled off. Low read rates and high misread rates result in increased manual labor, reduced efficiency, and lead to increased costs. It is therefore desirable to provide a mechanism for CAR which increases read rates and decreases misread rates.

SUMMARY OF THE INVENTION

In a first aspect of the invention a document processing system includes an image capture system, a multiple engine recognition system, and an application system. The image capture system generates a first electronic image of a first region of a document, where the first electronic image has a first image format. The image capture system generates a second electronic image of a second region of a document, where the second electronic image has a second image format. The multiple engine recognition system transmits the first electronic image to a first recognition engine and a second recognition engine. The first recognition engine generates a first recognition result, and the second recognition engine generates a second recognition result. The recognition system further combines the first recognition result and the second recognition result into a final recognition result. The application system transmits the first electronic image from the image capture system to the recognition system and retrieves the final recognition result from the recognition system. Utilizing multiple recognition engines allows greater customization of the final recognition result, and therefore improves both read rates as well as misread rates.

In a second aspect of the invention, a multiple engine recognition system includes a data storage medium containing a first set of parameter data corresponding to a first recognition engine, and a second set of parameter data corresponding to a second recognition engine. The first recognition engine generates a first recognition result based on a first electronic image and the first set of parameter data. The second recognition engine generates a second recognition result based on the first electronic image, a second electronic image, and the second set of parameter data. The second electronic image is of a second region of the document. The multiple engine recognition system further includes a routing module for routing the first electronic image and the first set of parameter data to the first recognition engine. The routing module further routes the first electronic image, the second electronic image, and the second set of parameter data to the second recognition engine. The routing module also retrieves the first recognition result from the first recognition engine and the second recognition result from the second recognition engine. A runtime module retrieves the first set of parameter data and the second set of parameter data from the storage medium.

In a third aspect of the invention, a computerized method for recognizing information contained in a first region of a document includes the step of storing a first set of parameter data to a data storage medium, where the first set of parameter data corresponds to a first recognition engine. A second set of parameter data is also stored to the data storage medium, where the second set of parameter data corresponds to a second recognition engine. The method further provides for retrieving the first set of parameter data and the second set of parameter data from the storage medium, and routing a first electronic image and the first set of parameter data to the first recognition engine, where the first electronic image represents the first region of the document. The first electronic image, a second electronic image, and the second set of parameter data is routed to the second recognition engine. The method also includes the step of retrieving a first recognition result from the first recognition engine and a second recognition result from the second recognition engine. The first recognition result and the second recognition result are then combined into a final recognition result.

BRIEF DESCRIPTION OF THE DRAWINGS

The invention is set forth in exemplary fashion by the following detailed description of a preferred embodiment taken in conjunction with the drawings, in which:

FIG. 14 is a screen capture of a portion of a data storage medium directory structure in accordance with the principals of the present invention.

DETAILED DESCRIPTION OF THE PREFERRED EMBODIMENTS

Figure 1:
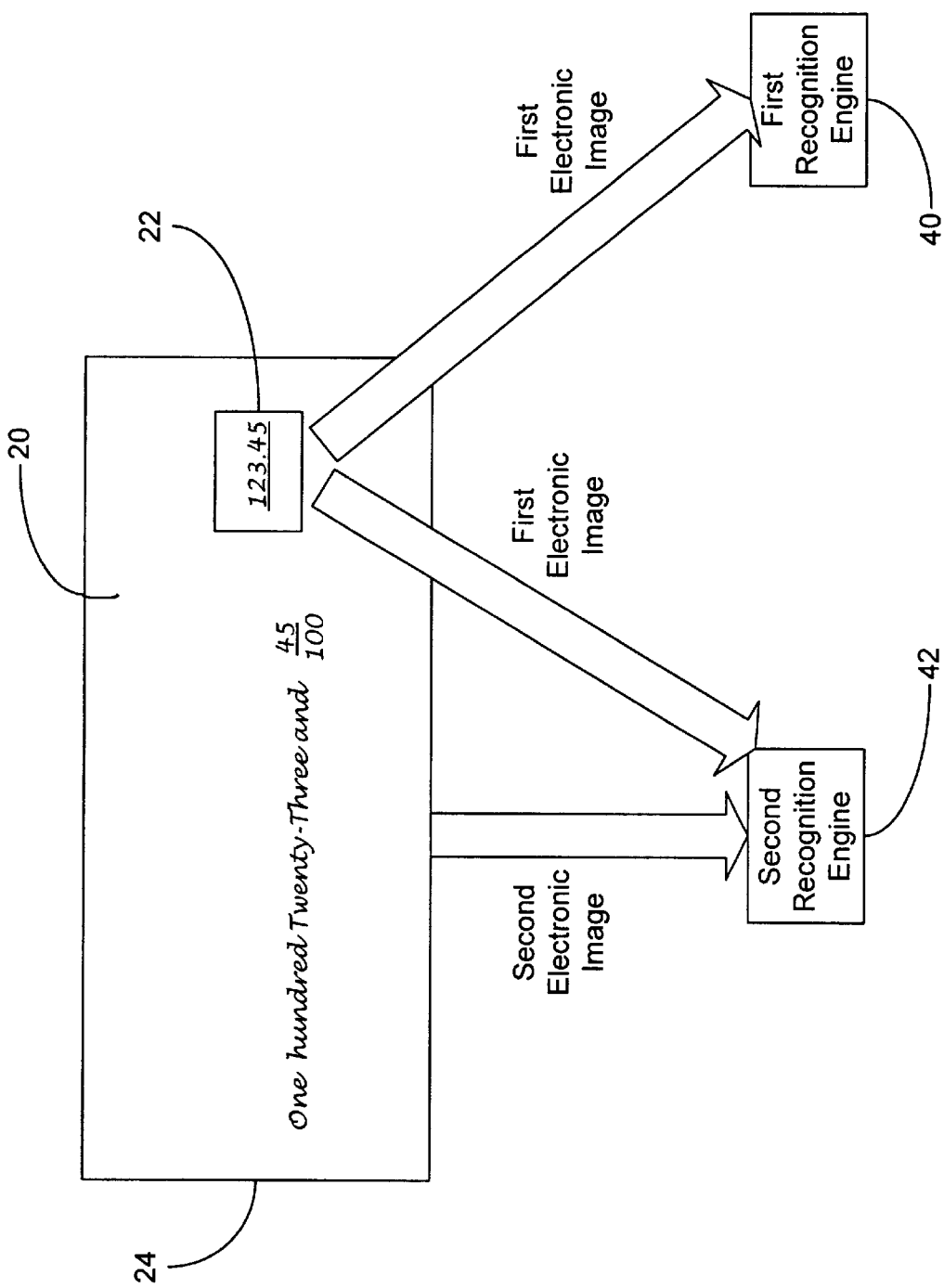
FIG. 1 is a diagram of a financial document undergoing CAR in accordance with the principals of the invention.

Turning now to FIG. 1, a financial document containing handwritten information to be recognized via multiple recognition engines is shown generally at 20. While document 20 is preferably a standard check, the present invention can be applied to virtually any document containing computer recognizable information. Nevertheless, it will be appreciated that document 20 has a first region 22 containing handwritten courtesy amount information which is the target of the recognition process. Document 20 also has a second region 24 containing legal amount information which can be used to confirm or supplement the recognition of the first region 22. Thus, the multiple engine recognition system of the present invention sends a first electronic image of the first region 22 to a first recognition engine 40 and a second recognition engine 42. The use of multiple recognition engines 40, 42 allows enhanced manipulation of read results and leads to increased read rates and reduced misread rates. Preferably, multiple engine recognition system 50 of the present invention further transmits a second electronic image of the second region 24 to the second recognition engine 42 to further improve recognition rates. It is common practice for both images to be captured at the same time.

Figure 2:
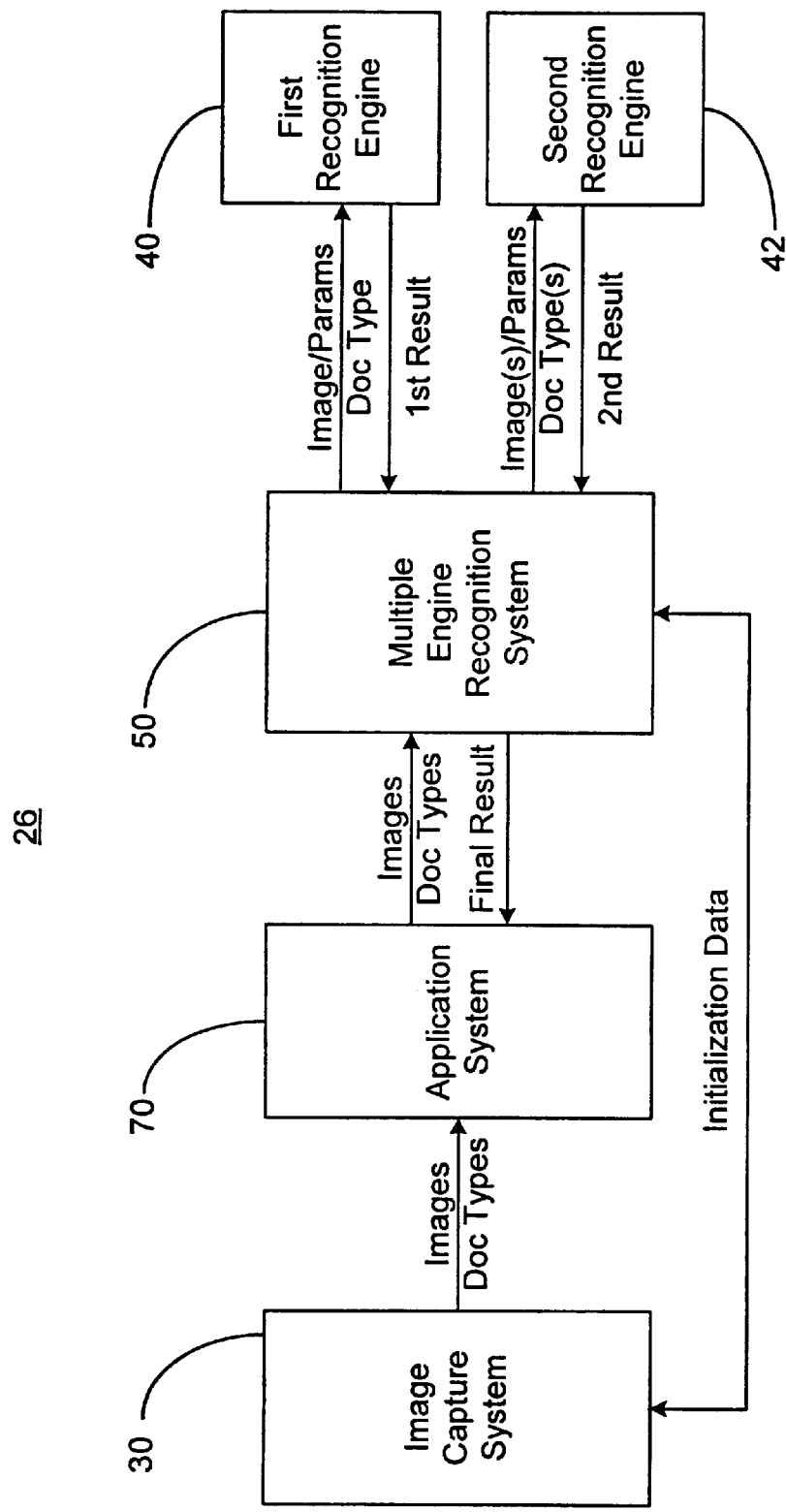
FIG. 2 is a block diagram of a document processing system in accordance with the principals of the invention.

FIG. 2 demonstrates a document processing system 26 according to the present invention. Generally, the document processing system 26 includes an image capture system 30 for generating multiple electronic images of the document 20 as well as document type information for the document 20. An application system 70 transmits both the electronic images and the document type information from the image capture system 30 to the recognition system 50, and retrieves the final recognition result from the recognition system 50. After the capture function is completed, an application 70, typically part of the amount entry application function, provides the recognition system 50 the information it needs to perform the CAR recognition function. The information is of two different types, static/setup and dynamic/request. The static or setup information provides the recognition system 50 common information for an application job basis, e.g. type of images to be processed. The dynamic or requested information provides the specific images and the document type (i.e. CAR location) information for one particular document. The recognition system 50 receives this information and distributes it to the various recognition engines 40, 42. The recognition system 50 also provides the various formatted images to a first recognition engine and a second recognition engine. Any given engine may not be able to perform recognition on all the images captured. In that case, the engine is provided only those images it is known to work with.

The application system 70 includes an application which typically uses reader (MICR and/or OCR) data from the documents to determine if images for a given document are to be captured, the types (i.e. format) to be captured and also identifies the document type (i.e. CAR location). As will be discussed in greater detail below, the first electronic image has a first image format. A multiple engine recognition system 50 transmits the first electronic image to the first recognition engine 40 and the second recognition engine 42. As will be discussed below, the image capture system transmits document type information to assist the recognition system 50 in transmitting the necessary parameters to the recognition engines 40, 42. The first recognition engine 40 generates a first recognition result, and the second recognition engine 42 generates a second recognition result. The recognition system 50 therefore combines the first recognition result and the second recognition result into a final recognition result.

As already discussed, the image capture system 30 preferably generates a second electronic image of the second region, where the second electronic image has a second image format. The application system 70 transmits the second electronic image from the image capture system 30 to the recognition system 50, and the recognition system 50 transmits the second electronic image to the second recognition engine 42. The second recognition engine is preferably capable of performing courtesy amount recognition (CAR) and legal amount recognition (LAR). Performing both CAR and LAR allows the CAR result to be compared to the LAR result for improved accuracy. Recognition engines performing CAR are readily available in the industry, and a preferred engine is available from the CGK Computer company under the product name RecoStar. Similarly, a preferred recognition engine for performing CAR and LAR is available from Mitek Systems, Inc. under the product name QuickStokes.

Figure 3:
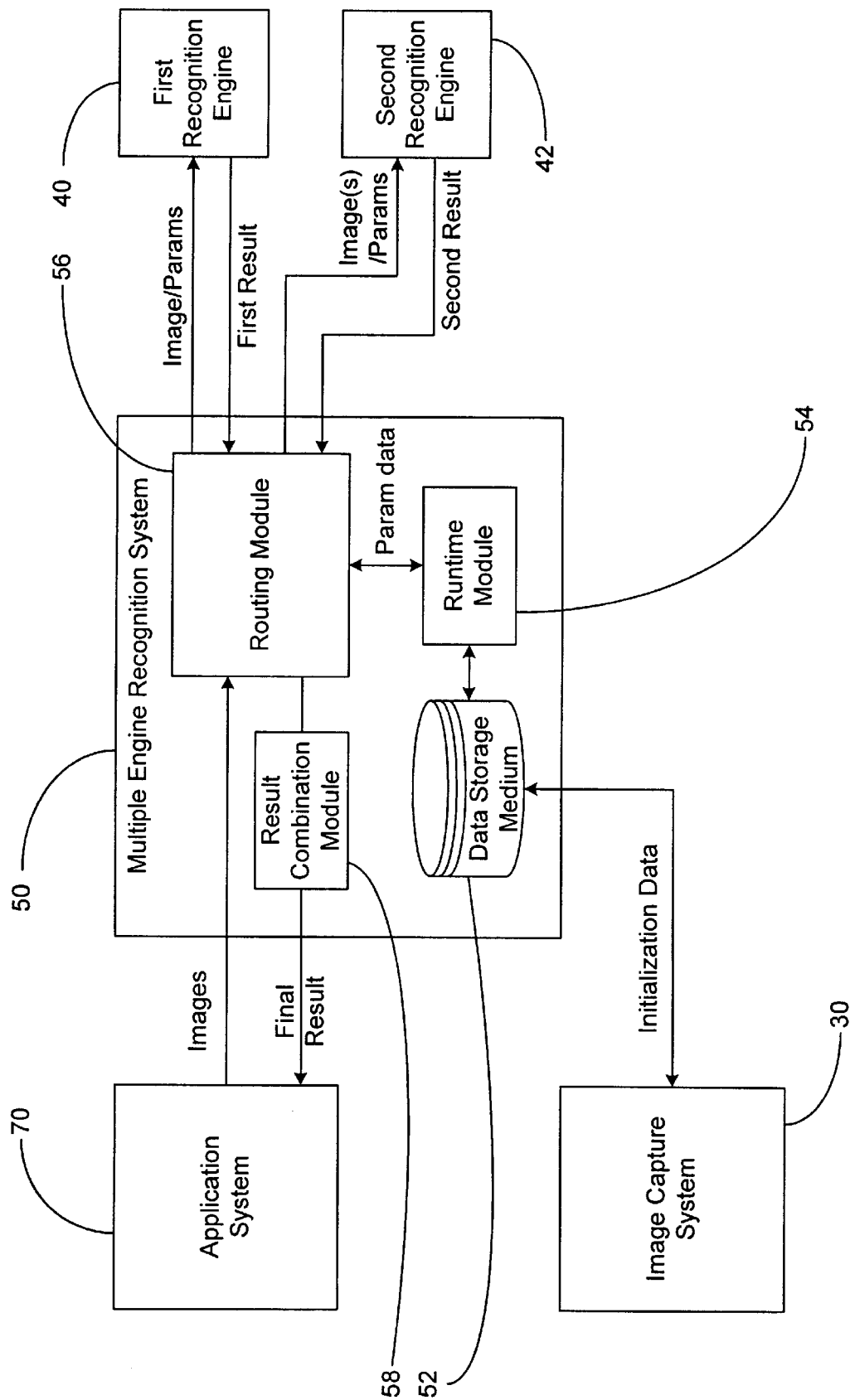
FIG. 3 is a block diagram of a multiple engine recognition system in accordance with the principals of the invention.

Turning now to FIG. 3, it can be seen that the recognition system 50 includes a data storage medium 52, a runtime module 54, and a routing module 56. The data storage medium 52 acts as a catalog, and contains an image parameter set for each recognition engine the first set of parameter data corresponding to the first recognition engine as well as a second set of parameter data corresponding to the second recognition engine 42. The first and second sets of parameter data are preferably image parameter sets for each recognition engine. The runtime module 54 retrieves the first set of parameter data and the second set of parameter data from the storage medium 52 and transmits the parameter data to the routing module 56. The routing module 56 routes the recognition parameters to the recognition engine(s) 40 and 42. It can also be seen that the routing module 56 routes the first electronic image, the second electronic image, and the second set of parameter data to the second recognition engine 42. The routing module 56 further retrieves the first recognition result from the first recognition engine 40 and the second recognition result from the second recognition engine 42. Thus, the recognition engines 40, 42 are provided with all of the necessary information to perform their respective recognition functions.

As will be discussed below, the storage medium 52 includes an engine-specific directory structure for efficiently organizing the parameter data as well as capture initialization data for the document 20. Thus, the data storage medium contains all of the static recognition parameters needed for the proper operation of the coordinated recognition system processes. The collective sum of all possible parameters is termed the "Catalog", which is implemented as a file directory structure. The major subdirectories in the catalog are parameter sets termed the CARPARAMs. Multiple parameter sets are needed primarily due to different image scanner types (some customers may have multiple different document processors) and recognition system classifiers. Image scanners may have different image attributes in such areas as image density, contrasts, etc. Classifiers are needed to recognize the different types of character sets, and hand printing in various countries in the world. For any given recognition job, the application informs the recognition system 50 which parameter set to use for the types of requests it is about to send. As was described prior, the area on the image where the field to be recognized exist may be anywhere in the image. For various CAR field locations, the parameter set needs information to inform the engine where to look for the field on the image. This location information is also included in the parameter set. It is a desired aspect of a multiple engine recognition system 50 that each engine 40, 42 perform its field search in the same coordinated relative location on the image, or the engines might read totally different fields. Many users have internal documents such as deposit tickets of remittance stubs, which are unique to that institution or its customers. The institution may wish to also recognize amount fields on these documents. In general, this implies that the customer must identify an additional document type (i.e. CAR location) for the recognition system to recognize. The catalog is extensible for any given customer to include additional parameter set information. The catalog extension will insure that the information being included is coordinated for the multiple recognition engines.

It will further be appreciated that the recognition system 50 also preferably includes a result combination module 58 for comparing the first recognition result and the second recognition result. The result combination module 58 selects between the first recognition result and the second recognition result based on a predetermined set of criteria. Results typically consist of three parts: a) status on the recognition request, b) the CAR data and c) the confidence level or score for the data. The status indicates an indication of the process and/or the type of information recognized (e.g. read or not read, above or below acceptance threshold, hand/machine, CAR/LAR, etc). The data is what the system interprets to be the amount. The confidence or score indicates the systems confidence in the data result returned. Higher scores indicate higher confidence, lower scores indicate lower confidence. "Not read" status has two connotations: a) was there any data result, and b) if there was, was its associated confidence above a user specifiable confidence threshold. As will be discussed below, recognition system 50 preferably has a managed network configuration of multiple recognition PC's. One of the PC's termed the "Manager", manages the interface to the user application as well as the distribution of requests to recognition PC's termed a "Reco Unit". A manager can also be a reco unit. A reco unit communicates with the manager, and manages the recognition engines. The addition of additional PC's to a system provides the ability to process more requests in a given time frame.

In a preferred embodiment, the first electronic image includes a JPEG snippet image, the first image format includes a JPEG snippet format. It is further preferred that the second electronic image includes a CCITT image, and the second image format includes a CCITT format. It is well known in the art that JPEG images are gray scale images with approximately 200/240 DPI. It is further known that CCITT images are high resolution images with approximately 200/240 DPI. Providing recognition engines with multiple images and image formats allows the result combination module 58 to improve recognition rates via more detailed combination logic.

Figure 4:
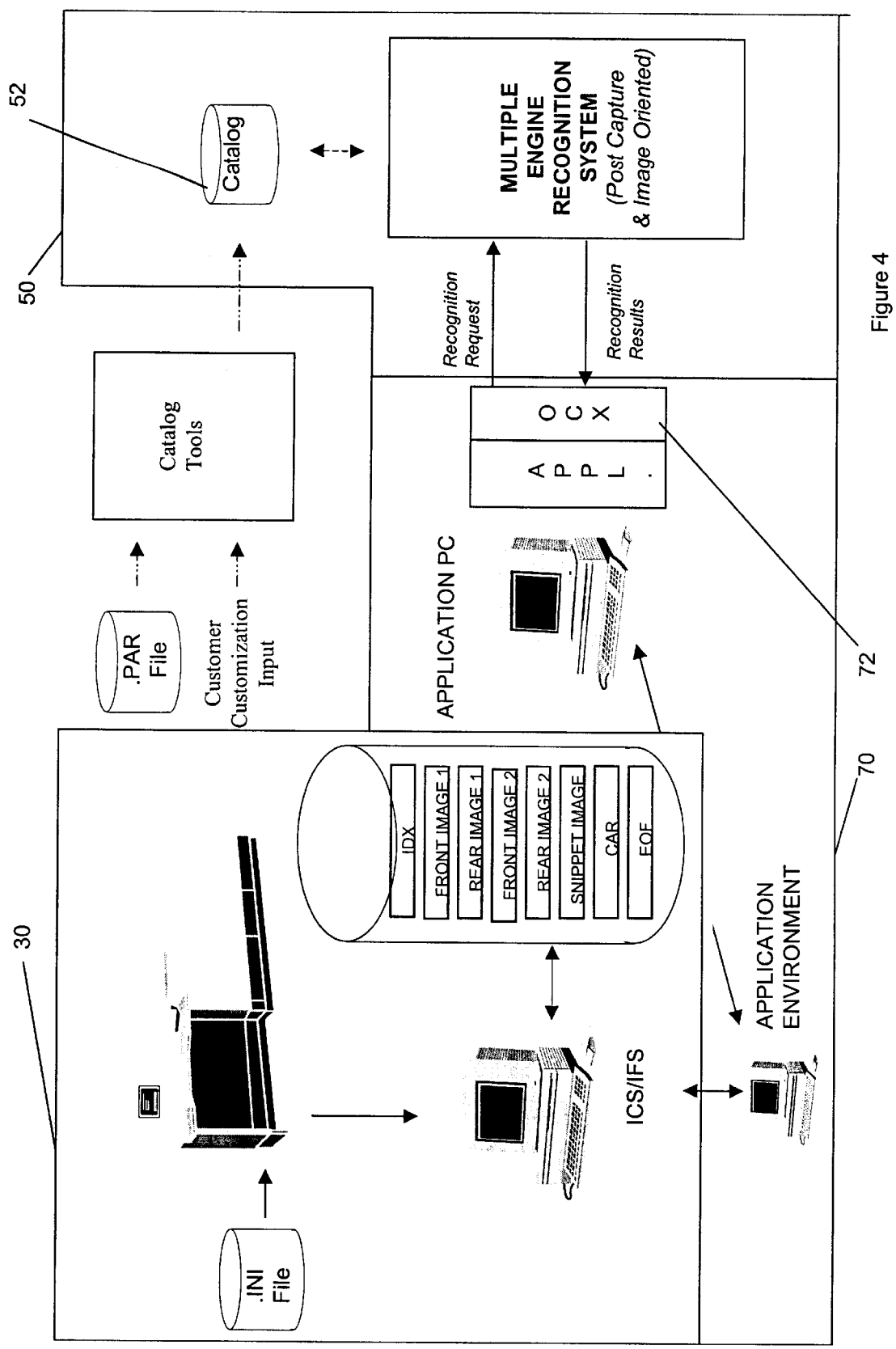
FIG. 4 is a more detailed block diagram of a document processing system in accordance with the principals of the invention.
Figure 5:
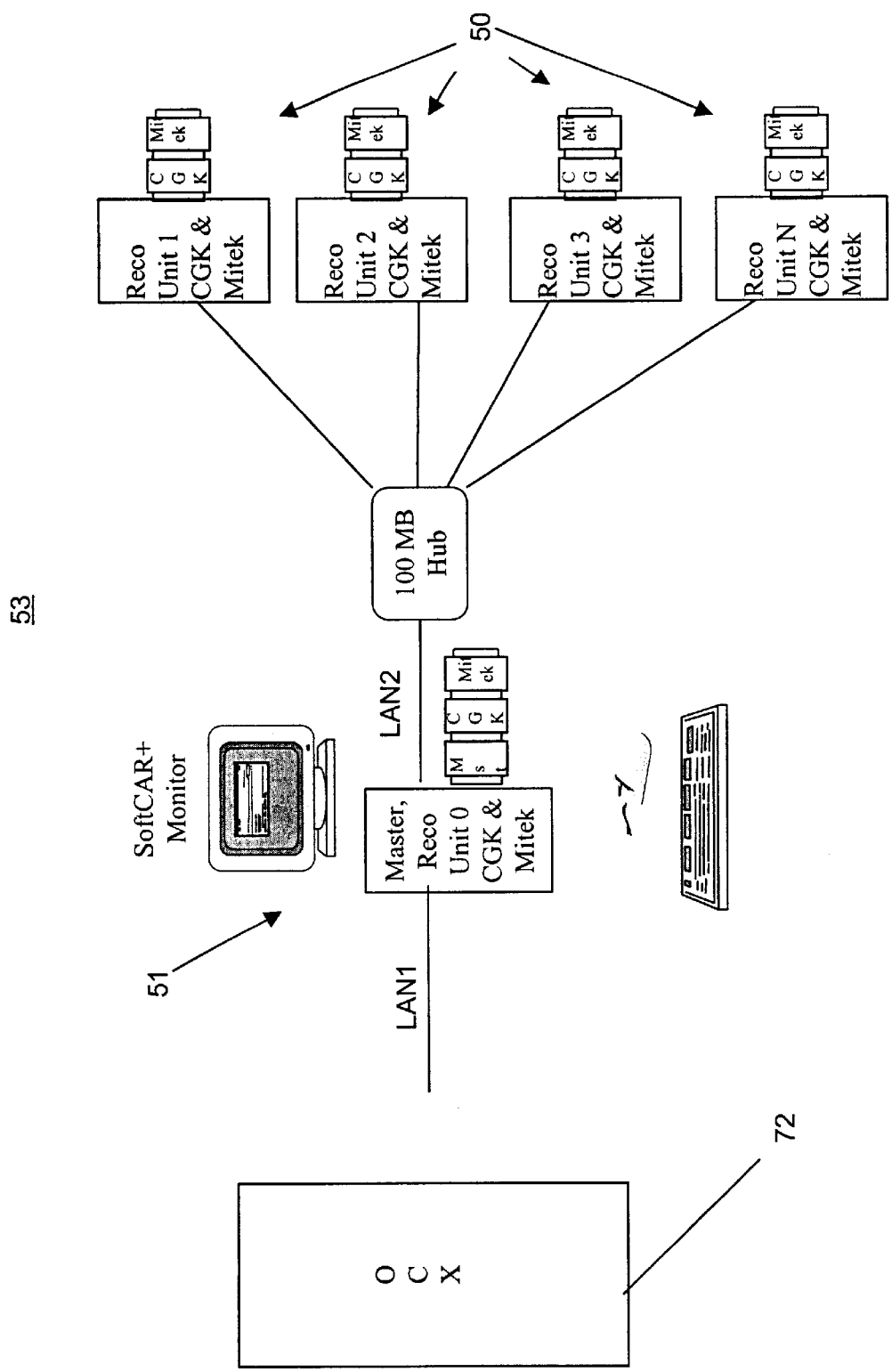
FIG. 5 is a block diagram of a networked subsystem including a plurality of multiple engine recognition systems in accordance with the principals of the invention.

As shown in FIG. 4, the application system 70 preferably includes an OCX interface 72 which is used to request recognition results on a per document basis. OCX interface 72 is an Active-X control that provides a programmatic interface to the recognition system 50. The OCX interface 72 is suitable for Visual Basic or Visual C++ applications and is generally required due to the use of multiple images and a generalized recognition result. It will be appreciated that the recognition result incorporates field scores, generalized status, and includes recognition type information.

Figure 6:
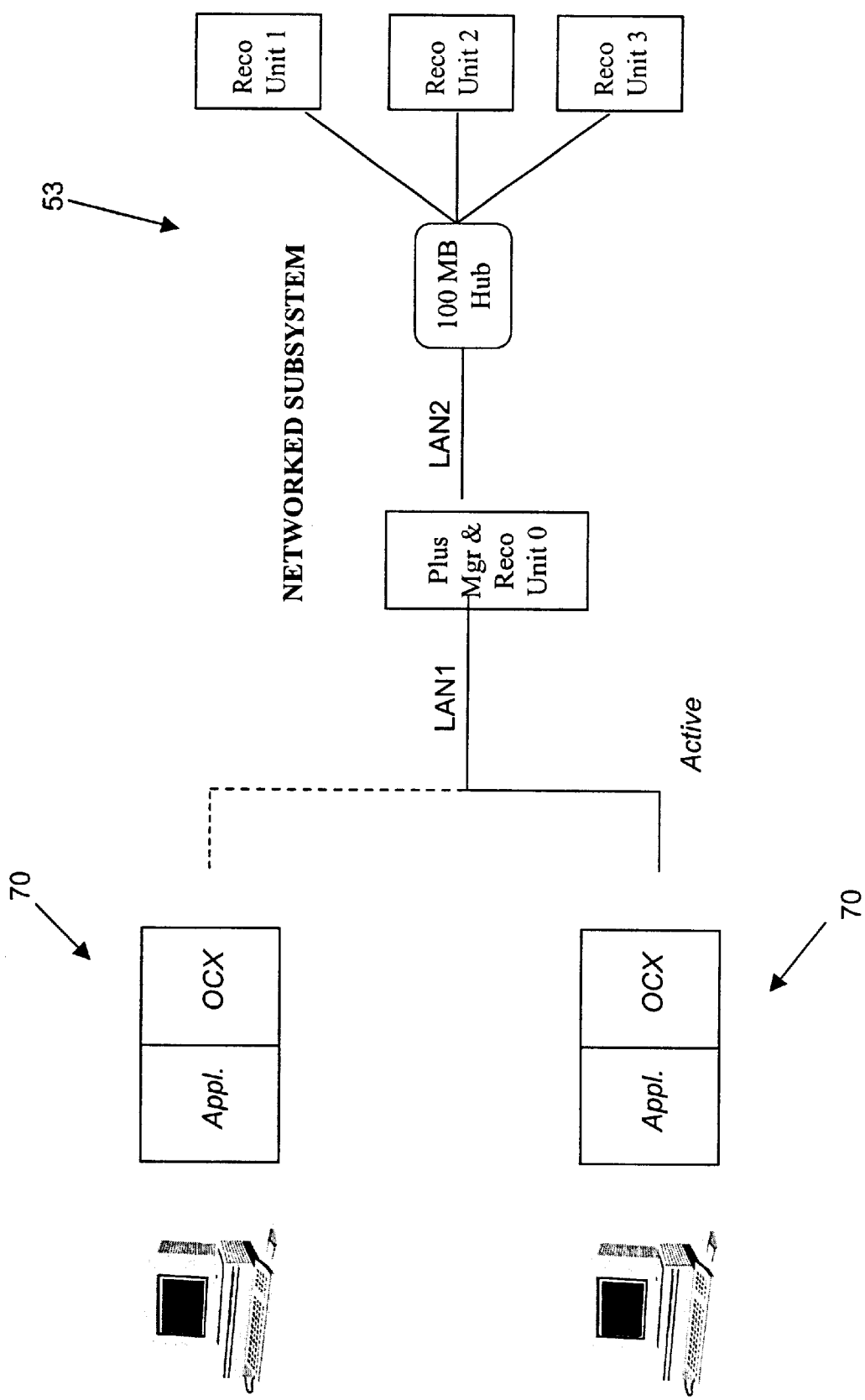
FIG. 6 is a block diagram of a networked subsystem interconnected to multiple application systems running on dedicated PC's in accordance with the principals of the invention.
Figure 7:
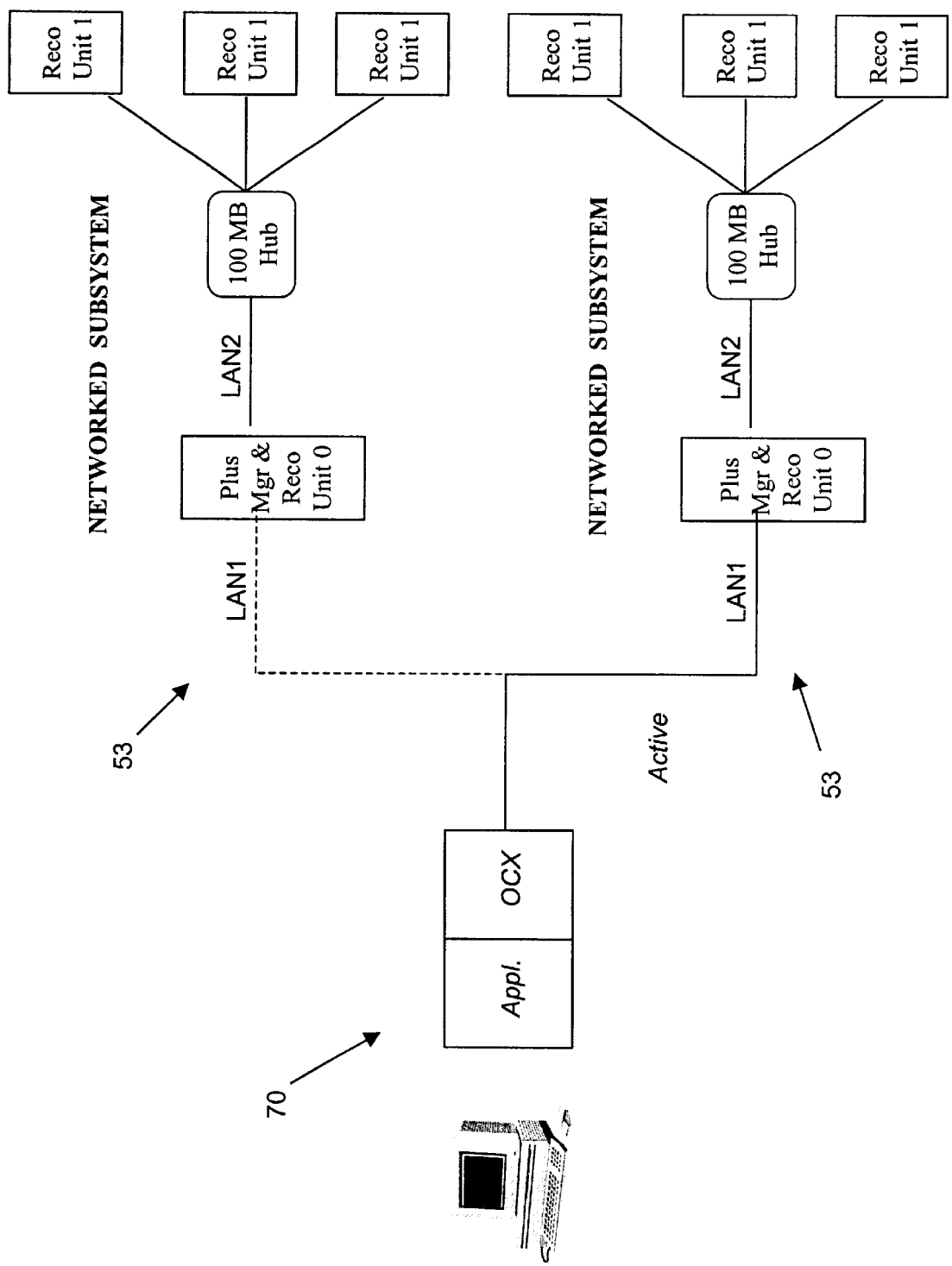
FIG. 7 is a block diagram of an application system interconnected to a plurality of networked subsystems in accordance with the principals of the invention.
Figure 8:
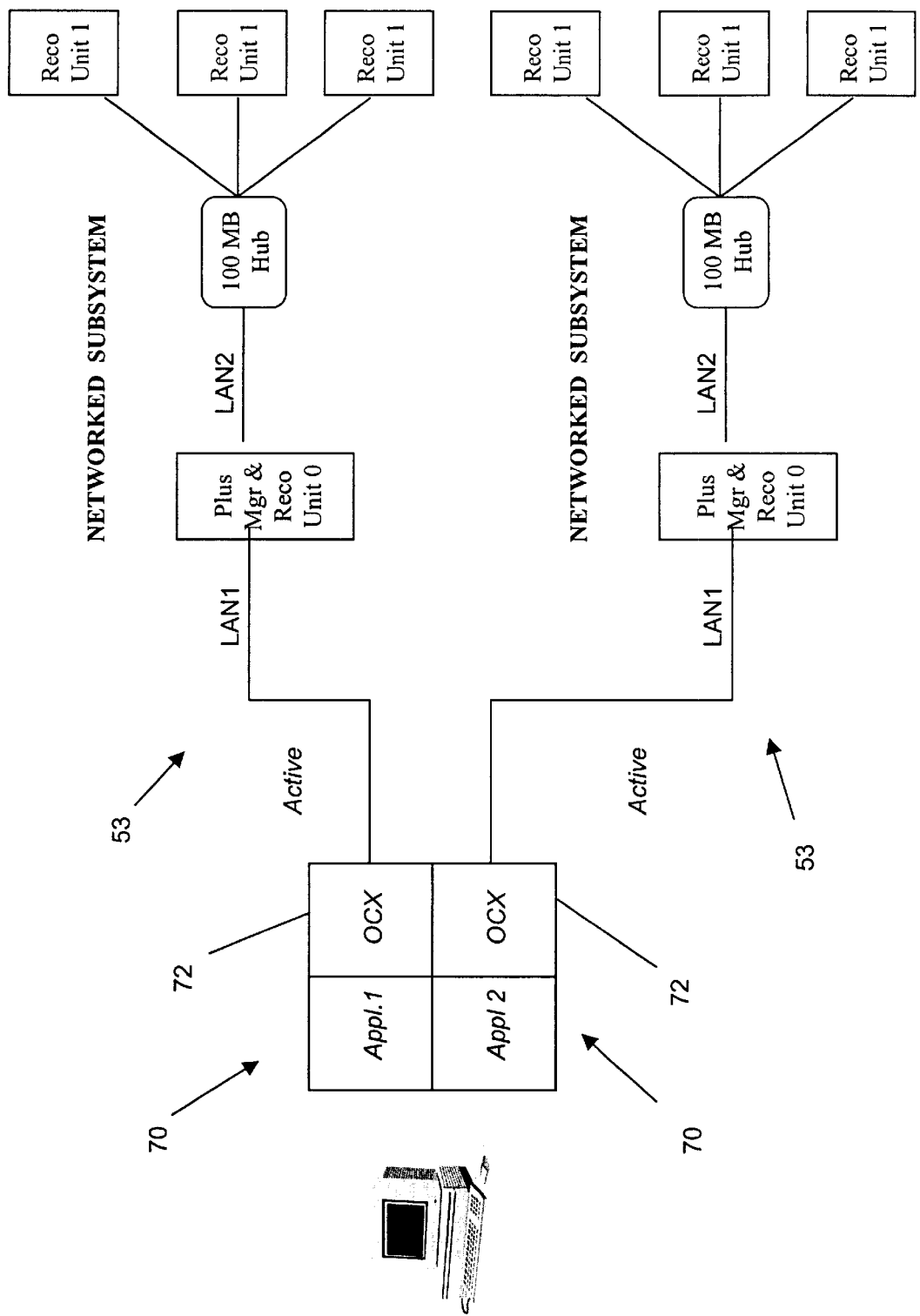
FIG. 8 is a block diagram of multiple application systems running on a shared PC interconnected with a plurality of networked subsystems in accordance with the principals of the invention.
Figure 9:
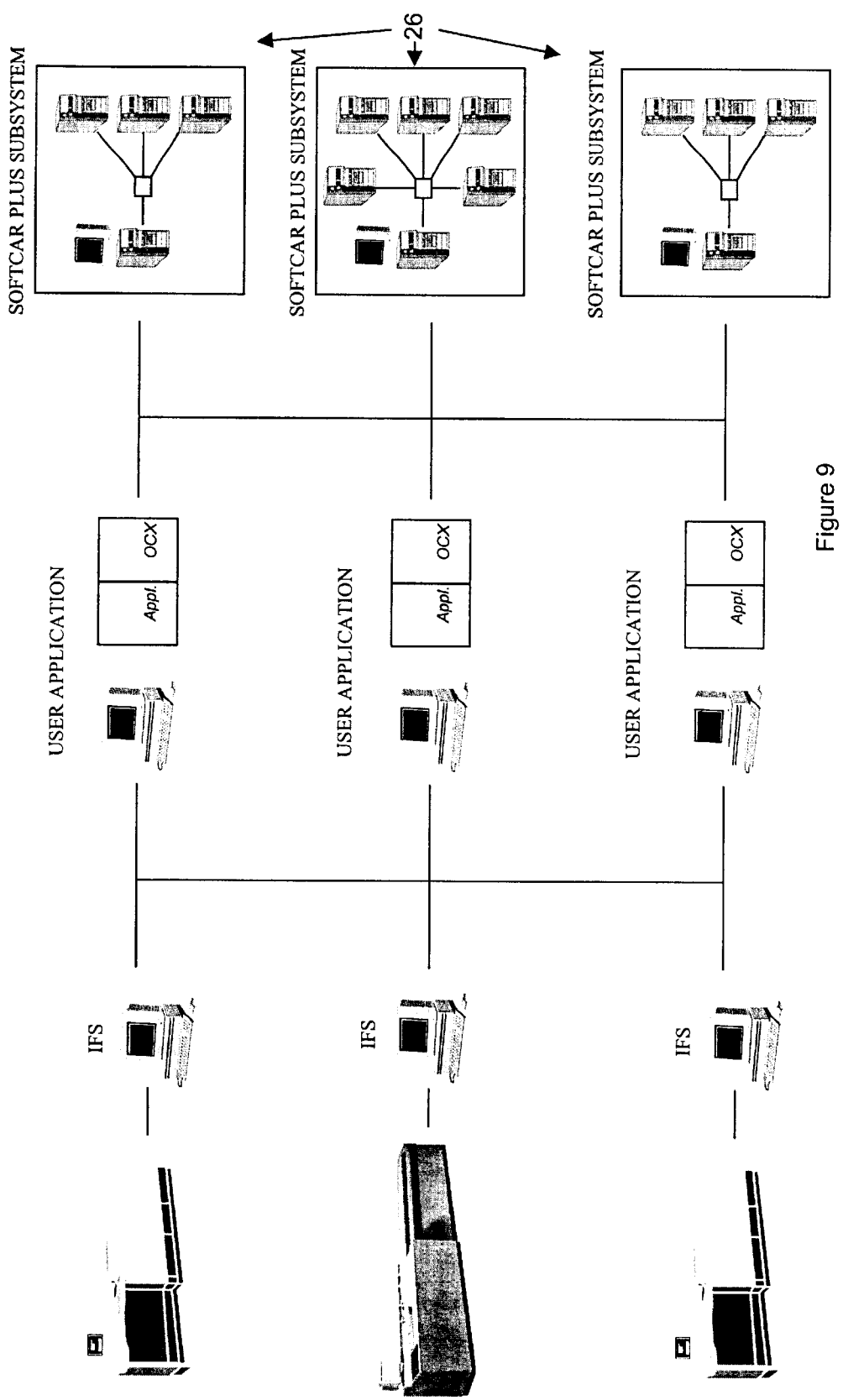
FIG. 9 is a block diagram of multiple interconnected document processing systems in accordance with the principals of the invention.
Figure 10:
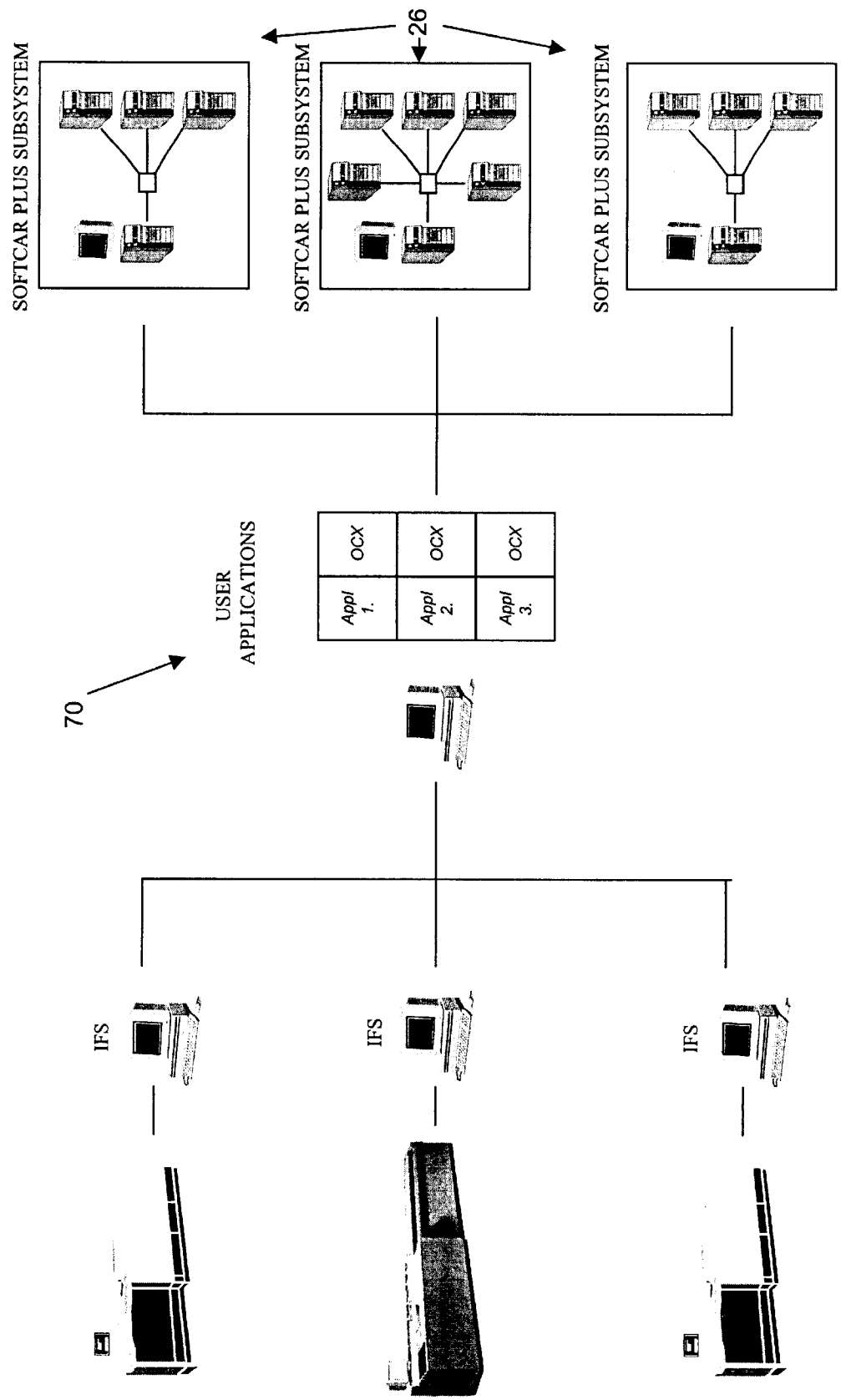
FIG. 10 is a block diagram of multiple document processing systems utilizing a shared PC to implement multiple application systems in accordance with the present invention.

Turning now to FIGS. 5–10, it will be appreciated that the multiple engine recognition system 50 of the present invention can be configured to meet the needs of many different applications. Specifically, FIG. 5 demonstrates a configuration with a plurality of multiple recognition systems 50 and a master recognition system 51 which also provides a monitoring function. The monitoring function displays ongoing status of the recognition system 50 as well as periodic results of recognition events. The result is a networked subsystem 53 which can serve as a building block for more complex configurations. FIG. 6 therefore demonstrates a networked subsystem 53 interconnected with multiple application systems 70 running on dedicated PC's. In FIG. 7, it can be seen that an application system 70 running on a shared PC can be interconnected with multiple networked subsystems 53. A further configuration is shown in FIG. 8 and includes multiple application systems 70 running on a shared PC interconnected with multiple networked subsystems 53. It can be seen that multiple application systems 70 can be run on a shared PC with multiple OCX interfaces 72. As shown in FIG. 9, multiple document processing systems 26 can be interconnected with dedicated application system PC's. Turning now to FIG. 10, it can be seen that multiple document processing systems 26 can also be interconnected with multiple application systems 70 running on a shared PC.

Figure 11:
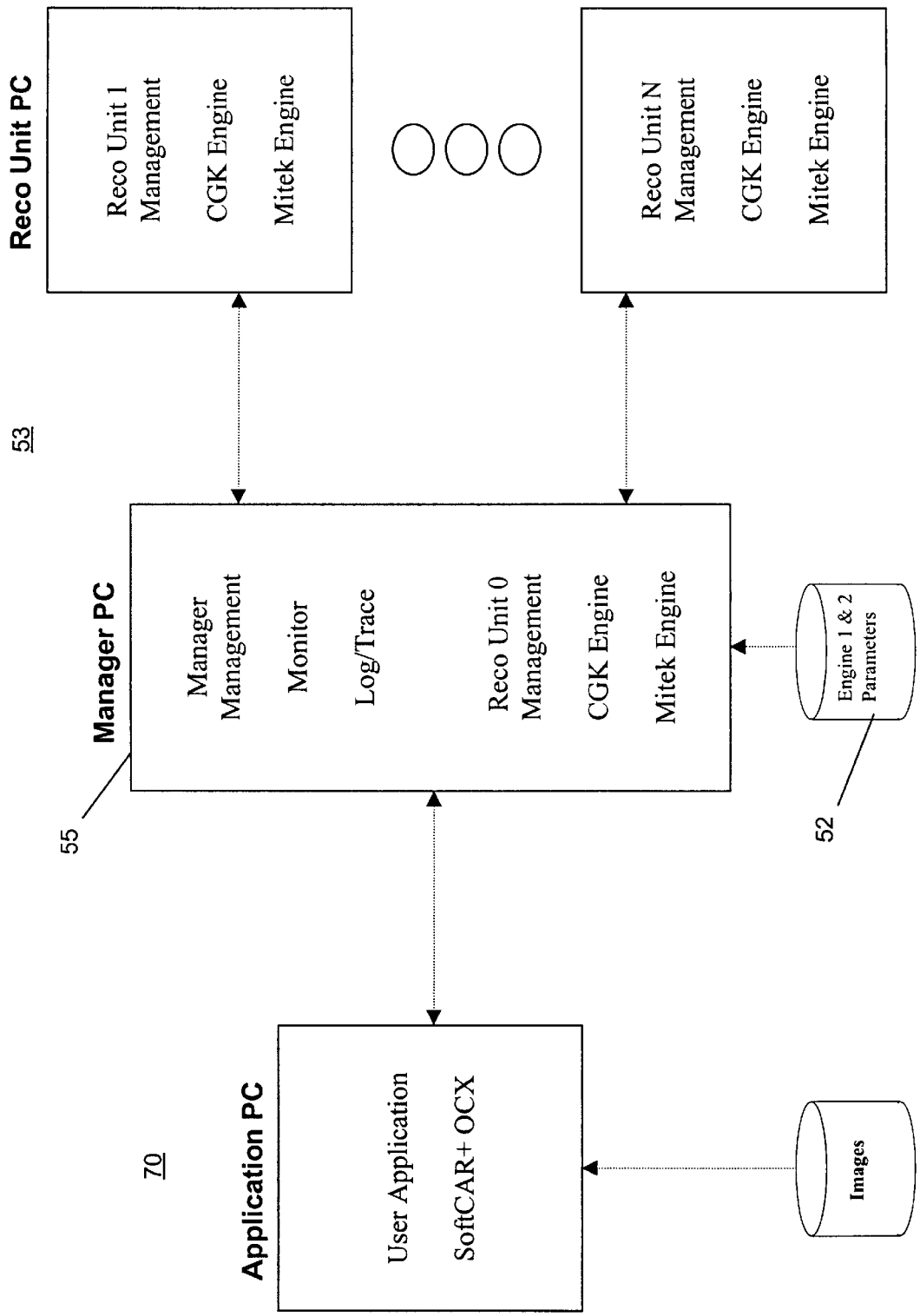
FIG. 11 is a block diagram of PC software distribution for an application system and a networked subsystem in accordance with the present invention.
Figure 12:
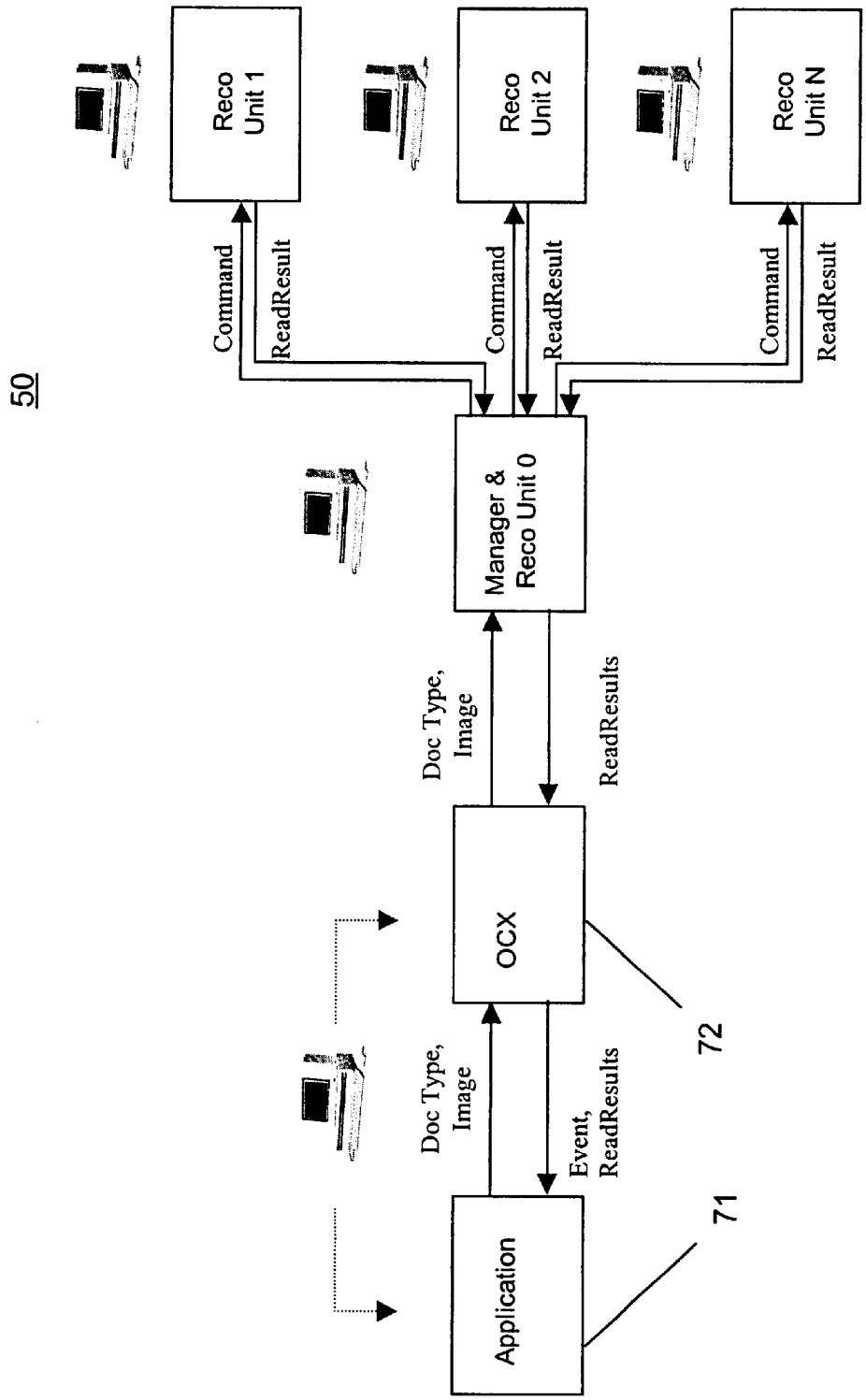
FIG. 12 is a block diagram of primary communication flow between an application system and a plurality of networked subsystem.

Turning now to FIG. 11, software distribution is shown for a networked subsystem 53. It can be seen that it is preferred to have a manager PC 55 act as a central recognition unit. The manager PC 55 can therefore retrieve the engine parameters from the data storage medium 52 and disburse them to the recognition unit PC's. Thus, as shown in FIG. 12, the primary communication flow is between the application 71, the OCX interface 72, and the recognition system PC's.

Figure 13:
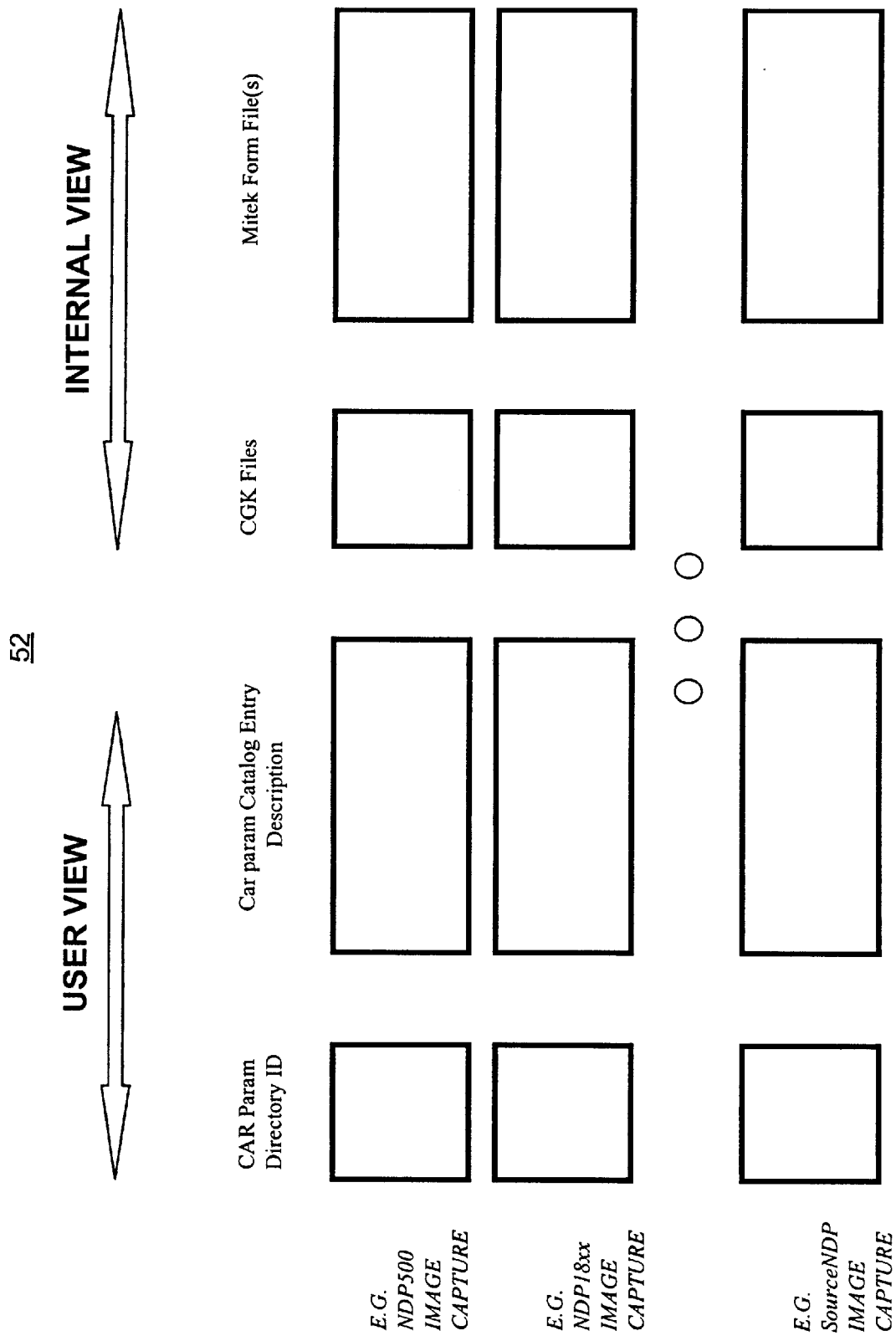
FIG. 13 is a block diagram of a data storage medium with an engine-specific directory structure in accordance with the present invention.

As shown in FIG. 13, the data storage medium 52 is cataloged with an engine-specific directory structure. Thus, a directory structure of tightly coupled recognition parameters is created. It will be appreciated that the file directory structure includes multiple CARPARAM directories, where an individual CARPARAM directory is a complete set of parameters for an application. A user with a single reference, i.e. CARPARAM directory name, can therefore identify all of the information needed for recognition by one or more recognition engines. This information includes recognition parameters and document type information. As discussed below, the CARPARAM directories can also be based on classifiers. It is also important to note that the catalog is extensible for the addition of internal document types and that the document types are synchronized. At the user level, the data storage medium 52 is cataloged on the basis of image capture system. Thus, for a given image capture system, the data storage medium 52 will be cataloged by CAR parameter director ID, and then CAR parameter catalog entry description. It will be appreciated that in an alternative embodiment, at the user level the data storage medium 52 can be cataloged on the basis of classifier. Classifiers are sets of country-specific data identifying handwriting conventions used in the particular country. At the internal level, the engine serves as the basis of the directory structure. A screen capture of a directory sample is shown in FIG. 14. For example, for the CarDP500 CARPARAM directory there are parameter files and document type files for both the first recognition engine 40 and the second recognition engine 42. Thus, Mitek subdirectory 60 includes all of the files necessary to recognize a file captured by a CarDP500 image capture system. All that is necessary is an identification of the document type.

Figure 15:
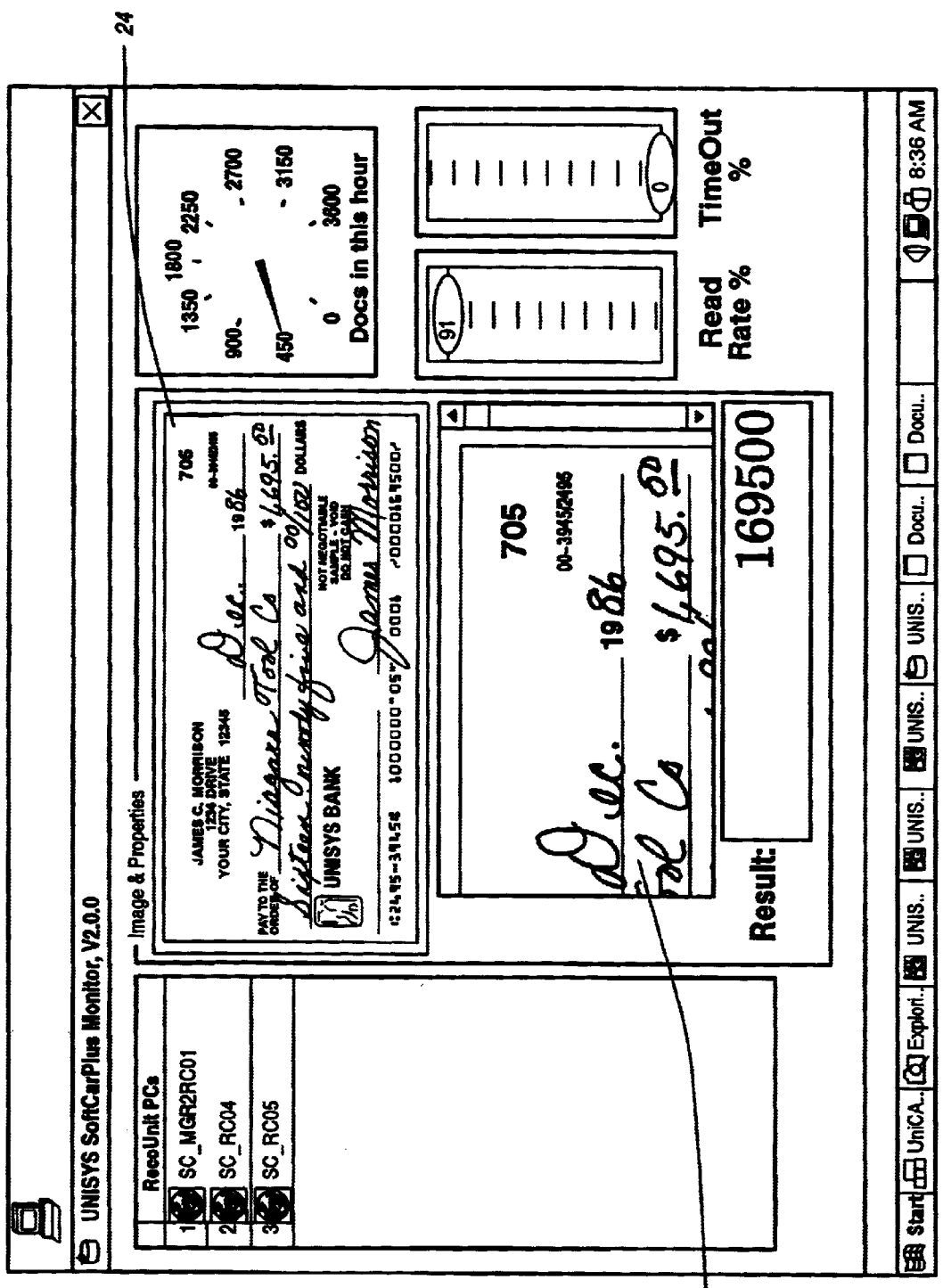
FIG. 15 is a screen capture of a preferred Manager PC monitor interface in accordance with the principals of the present invention.

It will further be appreciated that the catalog can be customized to meet the document needs of the individual customer. Turning now to FIG. 15, a sample monitor interface is shown for implementation at the manager PC. It can be seen that the first region 22 is displayed along with the second region 24 as captured in an electronic format.

The invention has been described with reference to a detailed description of a preferred embodiment for the sake of example only. The scope of the invention is to be determined by proper interpretation of the appended claims.

What is claimed is:

1. A document processing system comprising:
   an image capture system for generating a first electronic image of a first region of a document, the first electronic image having a first image format, and for generating a second electronic image of a second region, the second electronic image having a second image format;
   a multiple engine recognition system including a result combination module, for transmitting the first electronic image to a first recognition engine and a second recognition engine and transmitting the second electronic image to the second recognition engine, the first recognition engine generating a first recognition result and the second recognition engine generating a second recognition result, wherein the result combination module compares the first recognition result and the second recognition result and selecting between the first recognition result and the second recognition result to provide a final recognition result based on a predetermined set of criteria; and,
   an application system for transmitting the first electronic image and second electronic image from the image capture system tote multiple engine recognition system and retrieving the final recognition result from the recognition system.

2. The processing system of claim 1 wherein the multiple engine recognition system includes:
   a data storage medium containing a first set of parameter data corresponding to the first recognition engine and a second set of parameter data corresponding to the second recognition engine;
   a runtime module for retrieving the fist set of parameter data and the second set of parameter data from the storage medium; and
   a routing module for routing the first electronic image and the first set of parameter data to the first recognition engine, the routing module routing the first electronic image, the second electronic image, and the second set of parameter data to the second recognition engine, the routing module retrieving the first recognition result from the first recognition engine and the second recognition result from the second recognition engine.

3. The processing system of claim 2 wherein the storage medium includes an engine-specific directory structure.

4. The processing system of claim 3 wherein the storage medium further contains capture initialization data for the document, the image capture system using the capture initialization data to locate first region and the second region on the document.

5. The processing system of claim 1 wherein the document is a financial document, the first region includes a courtesy amount section, and the second region includes a legal amount section.

6. The processing system of claim 5 wherein the first electronic image includes a JPEG Snippet image, the first image format includes a JPEG Snippet format, the second electronic image includes a CCITT image, and the second image format includes a CCITT format.

7. A multiple engine recognition system for recognizing information contained in a first region of a document, the recognition system comprising:
   a data storage medium containing a first set of parameter data corresponding to a first recognition engine and a second set of parameter data corresponding to a second recognition engine, the fist recognition engine generating a first recognition result based on a first electronic image and the first set of parameter data, the second recognition engine generating a second recognition result based on the first electronic image, a second electronic image, and the second set of parameter data;

a routing module for routing the first electronic image and the first set of parameter data to the first recognition engine, the routing module routing the first electronic image, the second electronic image, and the second set of parameter data to the second recognition engine, the routing module further retrieving the first recognition result from the first recognition engine and the second recognition result from the second recognition engine;

a runtime module for retrieving the first set of parameter data and the second set of parameter data from the storage medium; and a result combination module for combining the first recognition result and the second recognition result to provide a final recognition result based on predetermined set of criteria.

8. The recognition system of claim 7 wherein the first electronic image has a first image format and the second electronic image has a second image format.

9. The recognition system of claim 8 wherein the storage medium includes an engine-specific directory structure.

10. The recognition system of claim 9 wherein the storage medium further contains capture initialization data for a document, an image capture system using the capture initialization data to locate the first region and a second region on the document.

11. The recognition system of claim 10 wherein the document is a financial document, the first region includes courtesy amount information, and the second region includes legal amount section information.

12. A computerized method for recognizing information contained in a first region of a document, the method comprising the steps of:

storing a first set of parameter data to a data storage medium, the first set of parameter data corresponding to a first recognition engine;

storing a second set of parameter data to the data storage medium, the second set of parameter data corresponding to a second recognition engine;

retrieving the first set of parameter data and the second set of parameter data from the storage medium;

routing a first electronic image and the first set of parameter data to the first recognition engine, the fist electronic image representing the first region of the document;

routing a second electronic image to the second recognition engine the second electronic image representing a second region of the document, routing the first electronic image and the second set of parameter data to the second recognition engine;

retrieving a first recognition result from the first recognition engine and a second recognition result from the second recognition engine; and combining the first recognition result and the second recognition result.

13. The method of claim 1 wherein the first electronic image has first image format and the second electronic image has a second image format.

14. The method of claim 13 wherein the storage medium includes an engine-specific directory structure.

15. The method of claim 14 further including the step of cataloging the engine-specific directory structure on a basis of an image capture system, the image capture system generating the first and second electronic images.

16. The method of claim 14 further including the step of cataloging the engine-specific directory structure on a basis of a classifier, the classifier identifying a handwriting convention of a country.

17. The document processing system of claim 5 wherein the courtesy amount section and legal amount section include handwritten information.

18. The document processing system of claim 11 wherein the courtesy amount information and legal amount information are handwritten.

* * * * *